Aug. 16, 1932.   C. S. BRAGG ET AL   1,872,397
BRAKE SYSTEM FOR AUTOMOTIVE VEHICLES
Original Filed Sept. 1, 1928   2 Sheets-Sheet 2

CALEB S. BRAGG and
VICTOR W. KLIESRATH   INVENTORS

BY
ATTORNEY

Patented Aug. 16, 1932

1,872,397

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Original application filed September 1, 1928, Serial No. 303,413. Divided and this application filed September 12, 1929. Serial No. 392,005.

Our invention consists in the novel features hereinafter described, reference being had to the accompanying drawings which show one embodiment of the same selected by us for purposes of illustration, and the said invention is fully disclosed in the following description and claims.

This application is a division of our former application for Letters Patent of the United States filed September 1, 1928, and given Serial No. 303,413.

The object of our invention is to provide in connection with a plurality of power actuators operating by differentials of fluid pressures a plurality of valves, each of which controls one of said actuators and is interposed in the connections between a single operator operated part and a part which is rigid with respect to the vehicle chassis. Each valve is provided with portions subjected to differentials of fluid pressures corresponding to those to which the opposite faces of the movable part of the actuator which it controls are exposed, and acting on the valve mechanism in a direction to prevent further increase in said differential of fluid pressures. The connections in which the valves are respectively located are provided with yielding means acting on the valve mechanism in opposition to the differential of fluid pressures thereon, and the tension of said yielding means for each valve mechanism is varied by the movement of the operator operated part.

In the form of our invention which constitutes the subject of this application the areas of the surfaces of the respective valves are substantially the same, and yielding means associated with the respective valve mechanisms are of different capacities, as hereinafter described, and the construction is such that the differential of fluid pressures on one of said valve mechanisms will overcome the tension of the yielding means connected therewith, during a power stroke of the actuator before the yielding means operative on another or other valve mechanisms is overcome, so as to effect the operation of the actuator connected with one valve mechanism to a predetermined extent, determined by the movement of the operator operated part before the actuator controlled by another of said valve mechanisms.

Our invention is particularly applicable to the operation of a vacuum brake system for automotive vehicles comprising a tractor and trailer, in which each vehicle is provided with a power actuator for applying brake mechanisms thereof, and the mechanism is so constructed and arranged that the trailer brakes will always be effectively applied before the brakes of the tractor and released after the brakes of the tractor, thus preventing the trailer from running up on the tractor and eliminating to a large extent the danger of what is termed "jack-knifing". In such vacuum brake systems the lower fluid pressure is a partial vacuum conveniently obtained by a connection with the intake manifold or suction passage of the internal combustion engine which propels the vehicle between the throttle valve and the engine cylinders, and the higher fluid pressure is atmospheric pressure.

In the accompanying drawings in which we have shown one embodiment of our invention selected by us for purposes of illustration, Fig. 1 represents a diagrammatic view of a vacuum brake system for tractor and trailer vehicles embodying our invention.

Figure 1:
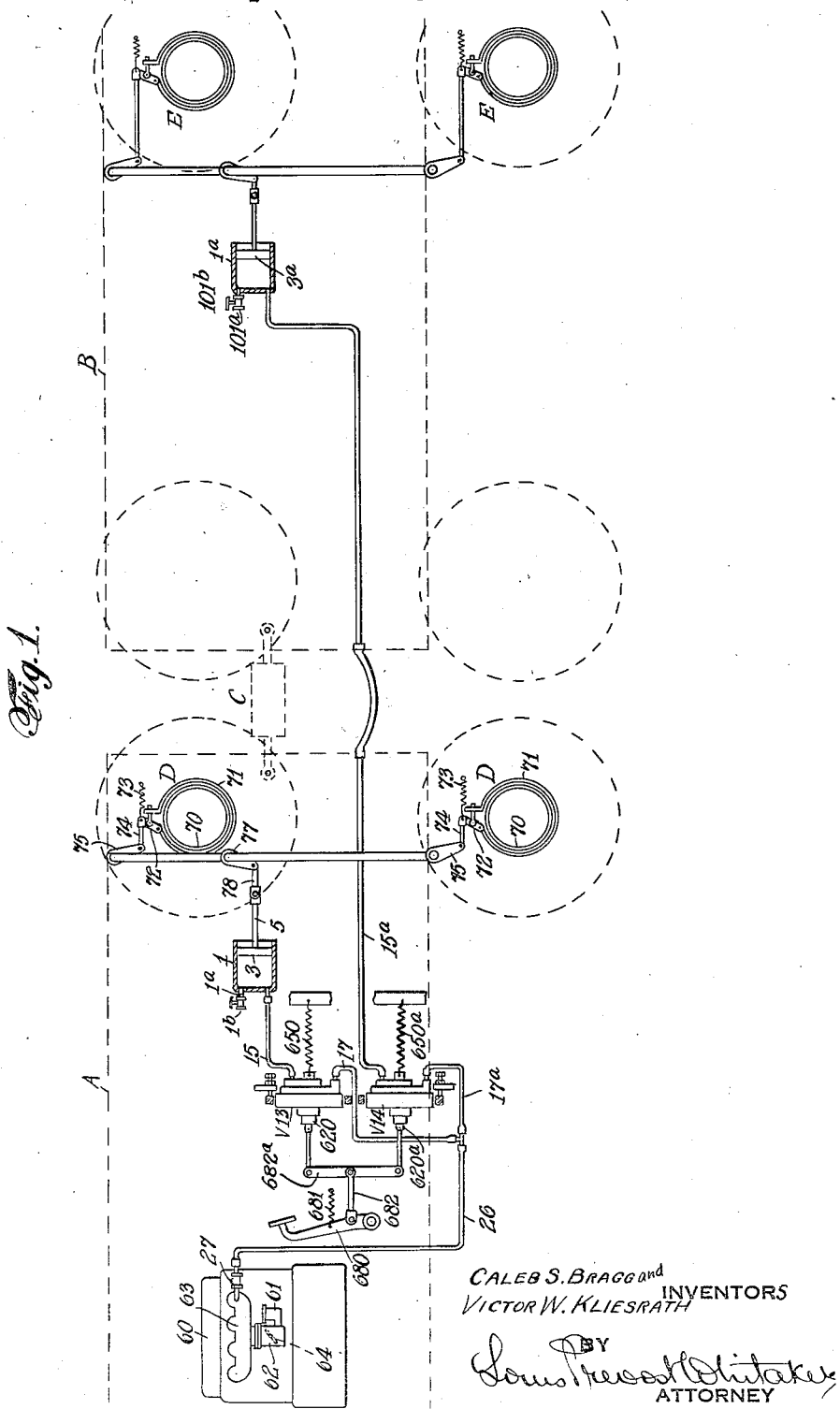

In the drawings we have shown in Fig. 1 diagrammatically an automotive tractor vehicle, indicated as a whole by dotted lines at A, and a trailer indicated similarly at B, connected to the tractor by suitable coupling means, C. The tractor vehicle, A, is provided with an internal combustion engine, 60, for propelling it, having the usual carburetor, 61, and suction passage, comprising a vertical portion, 62, and intake manifold, 63, the suction passage being provided with the usual throttle valve, 64. The tractor vehicle is shown provided with brake mechanisms, indicated at D, D, applied to the rear or non-steering wheels, but it is to be understood that it may be provided with brake mechanisms for any desired number of wheels and of any desired character. As shown, each of said brake mechanisms comprises a brake drum, 70, brake band, 71, brake lever, 72, and retracting spring, 73. The tractor vehicle is shown provided with a power actuator for operating the brake mechanisms of the vehicle, comprising in this instance a cylinder, 1, closed at one end and open to the atmosphere at the other end, and having a piston, 3, the piston rod, 5, of which is connected by a link, 78, with an arm, 77, on a rock shaft, 76, provided with arms, 75, connected by rods, 74, with brake levers, 72, it being understood that a power stroke of the piston, 3, will apply the brake mechanisms for the tractor with a predetermined force determined by the leverages in the connections between the piston and the brake mechanisms. The closed end of the cylinder, 1, is shown provided with a pipe, 1$^a$ for connecting it with the corresponding portion of another actuator cylinder or cylinders for simultaneous operation therewith if desired, and this pipe is shown provided with a cock, 1$^b$, for closing it when it is not in use.

The trailer, B, is provided with a power actuator comprising a cylinder, 1$^a$, and piston, 3$^a$, operatively connected with brake mechanisms, E, E, for the trailer, in the same manner as previously described with reference to the tractor, the various parts of the brake mechanisms and their connections with the power actuator, 1$^a$, being given the same reference numerals with the addition of the letter "a" to avoid repetition.

In this instance we have shown two valve mechanisms of identical construction and of the same size, arranged in parallel and having the pressure areas of their various parts the same. The specific form of the valve mechanism herein shown is covered by our former application for Letters Patent of the United States filed November 7, 1927, and given Serial No. 231,724, and is not claimed herein per se, and it will only be sufficiently described to enable our present invention to be clearly understood.

Figure 2:
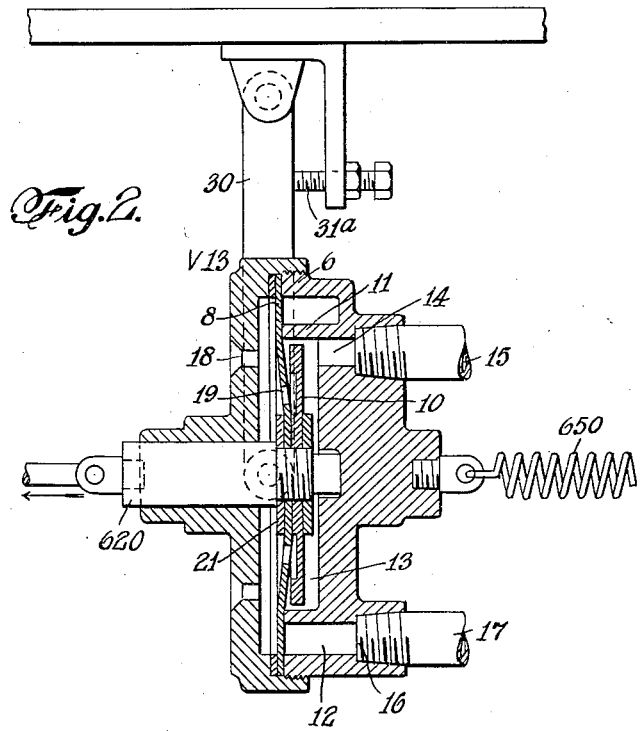
Fig. 2 is an enlarged detail view showing one form of controlling valve mechanism having portions exposed to the differential of fluid pressures, and illustrating the parts in their released positions.

One of these valve mechanisms is shown in section enlarged in Fig. 2, and as the construction of the two valve mechanisms is identical, we will describe only one and indicate the corresponding parts of the other in those figures in which both are shown, by the same reference numerals with the addition of the letter $a$. The valve mechanism is shown in the normal or the released position in Fig. 2, and it comprises a hollow casing, 6, provided interiorly with an annular seat, 11, dividing the adjacent portion of the casing into an annular suction chamber, 12, and a central chamber, 13, and said seat being adapted to be engaged by a diaphragm, 8, having its marginal portions in sealing engagement with the casing and provided with apertures, 19, which are at all times in communication with the atmosphere through apertures, 18.

Within the chamber, 13, is a disc valve, 10, having an annular seat for engaging the diaphragm to form an air-tight connection and close off communication between the chamber, 13, and the atmosphere. The disc valve and diaphragm are rigidly and sealingly connected with a valve actuating part, 620, movable through a central aperture in the casing. The casing is provided with an aperture, 14, communicating with the chamber, 13, and adapted to be connected by a pipe, as 15, with the power actuator which the valve mechanism controls, in this instance the cylinder, 1. The casing is also provided with an aperture, 16, communicating with the suction chamber, 12, and adapted to be connected by a pipe, indicated at 17 in Fig. 2, with the suction pipe, 26, which is in turn connected with the suction passage of the engine, (the intake manifold, for example) between the throttle valve and the engine cylinders, and is preferably provided with a check valve, 27, opening toward the manifold.

Figure 3:
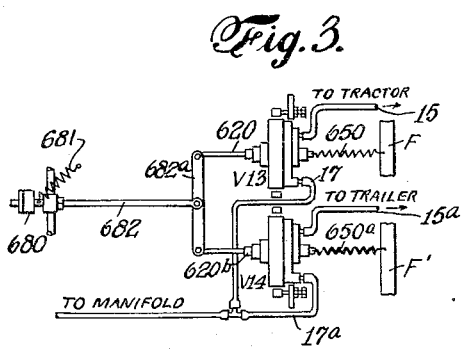
Fig. 3 is a detail view of the valve mechanism and operator operated parts of Fig. 1 showing two of such valve mechanisms located in connections between a common operator operated part and a fixed part of the chassis, each of said connections being provided with a spring of different capacity from that in the connections in which the other valve is located.

Each of the valve mechanisms are suspended so as to be movable in the direction of its axis, by means of a yoke, 30. We also provide each valve mechanism with a stop, 31$^a$, to engage the yoke, 30, and limit its movement when it returns to released position, as shown in Fig. 2. In Figs. 1 and 3 the valve mechanism for controlling the tractor brake mechanisms is indicated as a whole at $V^{13}$, and the valve mechanism for controlling the trailer brake mechanisms is indicated as a whole at $V^{14}$.

In this instance each valve mechanism is provided with a separate resistance spring, the resistance spring, 650$^a$, for the valve mechanism, $V^{14}$, which controls the trailer brakes, being stronger than the resistance spring, 650, which controls the tractor brakes. In this instance the valve mechanisms have their valve operating parts, 620 and 620$^a$, pivotally connected to opposite ends of an equalizer, 682$^a$, which is connected between its ends by the link, 682, to the pedal lever, 680, provided with the usual retracting spring, 681. The spring, 650, is connected at one end to the casing of the valve mechanism, $V^{13}$, and at its other end to a fixed part of the vehicle, indicated at F, and the heavier spring, 650$^a$, has one end connected to the casing of the valve mechanism, V¹⁴, and the other end connected to the vehicle, as the fixed part, F¹.

Each of the valve mechanisms is also provided with means for limiting the relative movement of the valve actuating part thereof and the valve casing, as the collar, 21, on the valve actuating part, 620, in Fig. 2, which will be brought into engagement with the casing when the valve actuating part has been drawn out to its fullest extent in the direction of the arrow Fig. 2. These stop collars serve to protect the valves from injury in case the pedal lever is depressed more quickly than the air can be withdrawn from the respective actuator cylinders.

It will be seen that the retracting spring, 681, not only returns the foot lever to retracted position, but holds the valve mechanisms, V¹³, V¹⁴, normally in the position shown in Fig. 2, in which the diaphragm of each valve mechanism is seated and the disc valve unseated, thus connecting the actuator cylinder between its closed end and the adjacent end of the piston with the atmosphere, and as the opposite faces of each actuator piston is exposed to atmospheric pressure at all times, the pistons may be said to be submerged in atmosphere when the parts are in the released position, as indicated in Fig. 2.

Assuming that the engine is running with the throttle valve closed or partly closed, rarification will be produced in the suction passage of the engine, and the air will be exhausted from the suction pipe, 26, and from the annular suction chamber (12—Fig. 2) of each of the valve mechanisms, which in this position of the valve is disconnected from the corresponding central chamber (13—Fig. 2). The central portion of the diaphragm of each valve mechanism within the annular seat and the opposite faces of the disc valve are exposed to atmospheric pressure, while the portions of each diaphragm between the annular seat and the outer edge of the casing are exposed to vacuum in the suction chamber and to atmospheric pressure on the outer face, which differential of fluid pressures tends to press the diaphragm upon its seat when the engine is running. Aside from this differential of fluid pressures, the pressures on the opposite faces of the diaphragm and disc valve and the front and rear portions of the casings are substantially equalized. The spring, 650ᵃ, being stronger than the spring, 650, it will be obvious that when the foot lever is depressed, tending to draw the valve actuating parts, 620 and 620ᵃ, forward, it will require greater force to overcome the heavier spring, and therefore the heavier spring will hold back the casing of the valve, V¹⁴, so that the valve actuating part, 620ᵃ, will be opened, while the lighter spring will permit the entire valve casing to move forward during the first portion of the movement of the pedal lever, thus insuring the operation of the valve mechanism, V¹⁴, controlling the trailer brakes before the valve mechanism, V¹³, controlling the tractor brakes.

The operation of each valve mechanism with respect to the actuator if connected to pipe 1ᵃ controlled hereby is identical, and a description of the operation of one valve mechanism, as the valve mechanism, V¹³, shown in Fig. 2, will be sufficient for both. When the valve actuating part, 20, is drawn forward in the direction of the arrow Fig. 2, the disc valve, 10, will be moved into sealing engagement with its diaphragm, 8, closing off communication between the cylinder, 1, and the atmosphere, and thereafter moving the diaphragm, 8, away from its seat, so as to place the chamber, 13, and the connected actuator cylinder in communication with the adjacent suction chamber, 12, so that the exhaustion of air from the actuator cylinder will at once begin and will immediately cause a movement of the actuator piston in a direction to apply the brake mechanisms connected therewith, by reason of the differential of fluid pressures on opposite faces of the piston. A corresponding differential of fluid pressures will begin to build up on the opposite faces of the diaphragm and disc valve acting in a direction opposite to that indicated by the arrow in Fig. 2, and in opposition to the direction of the movement of the operator operated part, and increasing the initial resistance furnished by the retracting spring. This increase in resistance serves to apprise the operator of the extent to which the actuator is applying the brakes.

A differential of fluid pressures will also be built up on the opposite faces of the rear wall of the valve casing due to the fact that the entire inner face of said wall is subjected to rarification when the diaphragm is unseated, while the outer or rear face is exposed at all times to atmospheric pressure. This differential of fluid pressures gradually increases as the air is exhausted from the actuator cylinder and is exerted upon the valve casing, tending to move the entire valve casing forward in the direction of the arrow in Fig. 2, and in opposition to the tension of the spring, 650. The fluid pressures on opposite faces of the forward wall of the valve casing will always be substantially equal, as both faces are exposed at all times to atmospheric pressure. We have, therefore, in each valve mechanism a reactionary differential of fluid pressures on the valves tending to push them rearwardly with respect to the casing, and a differential of fluid pressures on the rear wall of the casing tending to push the casing forward in the direction of the arrow Fig. 2, with respect to the valves, both forces acting to reseat the diaphragm as soon as they are able to overcome the increased tension of the spring, 650, and thereby disconnecting the suction from the controlled actuator to prevent further increase in the differential of fluid pressures on the piston thereof, to hold the brake mechanisms as applied, as the disc valve remains seated upon the diaphragm after the diaphragm has been seated, as described.

Referring now to Figs. 1 and 3, when the operator desires to apply the brakes for a normal deceleration of the vehicles, he will depress the foot lever and exert his force on the valve actuating parts, 620 and 620a, of both valve mechanisms, $V^{13}$ and $V^{14}$, in the direction of the arrow Fig. 2, and correspondingly increasing the tension of the springs, 650 and 650a. As before stated the stronger spring, 650a, will offer more resistance to the forward movement of the valve casing than the lighter spring, 650, thus insuring the operation of the trailer brakes before the operation of the tractor brakes, the valve mechanism being operated successively as soon as their respective springs offer sufficient resistance to hold back the valve casing and permit the disc valve to be seated on the diaphragm and the diaphragm unseated. If the movement of the pedal is stopped at an intermediate position, the differentials of fluid pressures on the valve mechanism, $V^{13}$, controlling the actuator for the tractor brakes will overcome the weaker spring, 650, before the differential of fluid pressures on the valve, $V^{14}$, controlling the actuator for the trailer brakes will overcome the stronger spring, so that the trailer brakes will not only be applied first, but will be applied to a greater extent than the tractor brakes, until the foot lever has been moved to a point where the tension of both springs has been increased beyond the power of the differentials of fluid pressures on the respective valve mechanisms to overcome the same, when the brakes of both vehicles will be applied to the full extent of the power of their actuators. This prevents the possibility of the trailer running up on the tractor and producing the effect known as "jack-knifing", which frequently results in serious accidents. This operation of the brake mechanisms of trailer and tractor will follow even if the pedal lever is moved to its maximum extent without stopping, in which case the valve mechanism, $V^{14}$, connected with the heavier spring will remain open continually so as to apply the trailer brakes before the tractor brakes and with greater power than the tractor brakes, while the valve mechanism connected with the weaker spring may intermittently close and open until the tension of the spring, 650, has become so great that it cannot be overcome by the differential of fluid pressures on the valve, $V^{13}$, and the trailer brakes are fully applied after which the valve, $V^{13}$, will remain open until the tractor brakes are also applied with the full power of its actuator or actuators. It will thus be seen that upon either a gradual or a sudden and complete operation of the brake mechanisms, the slowing down of the trailer more rapidly than the tractor will be insured. The release of the brake mechanisms is effected in a manner exactly the reverse of their application. When the operator relieves his pressure on the pedal after either a partial or full application of the brakes of both trailer and tractor, the disc valve of the valve mechanism, $V^{13}$, the casing of which is connected with the weaker spring, will open before the disc valve of the valve mechanism, $V^{14}$, the casing of which is connected with the heavier spring, and the tractor brakes will begin to be released before the brakes on the trailer. If the operator removes his foot from the pedal for a full release of all the brakes, the tractor brakes will be fully released before those of the trailer, so that there will be no slack in the couplings between the vehicles when the operator steps on the accelerator to start or increase the speed of the vehicle. During the release of the brake mechanisms, the fluid pressures on the opposite faces of the rear walls of the valve casing will be equalized, the valve casing will be moved rearwardly by the springs 650 and 650a, and during this movement the disc valves will be reseated on the diaphragms whenever the opertor stops or arrests the rearward movement of his foot on the pedal, and during the release of the brakes the retarding effect of the trailer brakes remains effective longer than those of the tractor, as the parts are returned to the released positions.

It will be understood that our invention is not limited to the particular type of actuator or controlling valve mechanism herein shown. It is also to be understood that we do not limit ourselves to the particular details of the installation shown and described as illustrating one embodiment of our invention, as changes may be made therein by different constructors to meet the requirements of special installation.

In carrying our invention into effect, however, we prefer that the size of the actuator cylinders and pistons, and the leverages in the connections from the pistons to the brake mechanisms operated thereby, shall be such as to give the maximum braking effect by power desired on both vehicles, without locking the wheels on ordinary dry roadways, but regardless of these facts the construction will be such that the trailer will be retarded to a greater extent than the tractor under all circumstances when the brakes are applied up to the point where, as before stated, the maximum power of each actuator is exerted when they will, of course, be applied with the full power of the respective actuators, and the retarding effect of the trailer brakes remains effective longer than those of the tractor when the brake mechanisms are released and the parts returned to the released positions.

What we claim and desire to secure by Letters Patent is:—

1. In a vacuum brake system for automotive vehicles, the combination with a plurality of independently operable brake mechanisms and a plurality of power actuators each of which is connected with certain of said brake mechanisms only, of a plurality of valve mechanisms each controlling one of said actuators only, and each provided with relatively movable parts subjected to differentials of fluid pressures corresponding to those to which a movable part of the actuator which it controls is exposed and acting on the valve mechanism in a direction to prevent further increase in said differential of fluid pressures, a single operator operated part operatively connected with each of said valve mechanisms, separate yielding means acting upon each valve mechanism in opposition to the differential of fluid pressures thereon, the corresponding faces of the parts of said respective valve mechanisms exposed to differentials of fluid pressures being of substantially equal area, and said separate yielding means exerting different degrees of tension on the valve mechanisms connected respectively therewith, and means for connecting each actuator with sources of higher and lower fluid pressures through the controlling valve mechanism therefor.

2. In a vacuum brake system for automotive vehicles, the combination with a plurality of independently operable brake mechanisms and a plurality of power actuators each of which is connected with certain of said brake mechanisms only, of a plurality of valve mechanisms each controlling one of said actuators only, each of said valve mechanisms being provided with means for connecting it with sources of higher and lower pressure and having relatively movable parts subjected to differentials of fluid pressures corresponding to those to which a movable part of the actuator which it controls is exposed and acting on the valve mechanism in a direction to prevent further increase in said differential of fluid pressures, and a single operator operated part for said valve mechanisms, yielding means acting upon each valve mechanism in opposition to the differential of fluid pressures thereon, said valve mechanisms and said yielding resistances being interposed in connections between the operator operated part and a part connected with the vehicle, and said valve mechanisms being movable bodily with respect to the vehicle, the parts of the respective valve mechanisms having substantially the same areas, and the yielding resistances for said respective valve mechanisms exerting respectively different degrees of tension thereon.

3. In a vacuum brake system for automotive vehicles, the combination with a plurality of independently operable brake mechanisms and a plurality of power actuators each of which is connected with certain of said brake mechanisms only, of a plurality of valve mechanisms each controlling one of said actuators only, each of said valve mechanisms comprising a valve casing, valve means movable with respect thereto, said valve casing and said valve means having parts subjected to differentials of fluid pressures in opposite direction and tending to move the valve mechanism into a position to prevent further increase in said differential of fluid pressures, each of said valve mechanisms being bodily movable and provided with means for connecting it with sources of higher and lower fluid pressures, a single operator operated part for all of said valve mechanisms, the valve means and valve casing of each valve mechanism being connected the one with said operator operated part and the other with a part connected with the vehicle, and a yielding resistance in the connections to each of said valve casings, the parts of each valve mechanism exposed to said differential of fluid pressures having substantially the same area, and said yielding resistances having different degrees of tension.

4. In a vacuum brake system for automotive vehicles including tractor and trailing vehicles, the combination with independently operable brake mechanisms for the trailer and tractor, a power actuator on each vehicle connected with brake mechanisms thereon, of a plurality of valve mechanisms on the tractor for independently controlling said actuators, each valve mechanism being provided with relatively movable parts subjected to differentials of fluid pressures corresponding to those to which a movable part of an actuator which it controls is exposed, and acting on the valve mechanism in a direction to prevent further increase in said differential of fluid pressures, means for connecting each valve mechanism with sources of higher and lower fluid pressures, an operator operated part on the tractor operatively connected with each valve mechanism, separate yielding means acting upon each valve mechanism in opposition to the differential of fluid pressures thereon, said valve mechanisms being bodily movable, and the parts of said valve mechanisms exposed to said differentials of fluid pressures being of substantially the same area, the yielding means acting upon said valve mechanisms having different tensions, and being constructed to effect the operation of the trailer brake mechanisms, and the actuation thereof to a predetermined extent before the corresponding actuation of the tractor brake mechanisms.

5. In a vacuum brake system for automotive vehicles including tractor and trailing vehicles, the combination with independently operable brake mechanisms for the trailer and tractor, a power actuator on each vehicle connected with brake mechanisms thereon, of a plurality of valve mechanisms on the tractor for independently controlling said actuators, each valve mechanism comprising a bodily movable valve casing provided with means for connecting it with sources of higher and lower fluid pressures, valve means movable with respect to the casing, said valve means and casing being provided with parts subjected to differentials of fluid pressures corresponding with those to which a movable part of an actuator controlled thereby is subjected, and tending to move said relative parts with respect to each other in a direction to prevent further increase in said differential of fluid pressures, an operator operated part on the tractor, the valve means and valve casing of each valve mechanism being the one connected with said operator operated part and the other connected with a part connected with the vehicle, the connections to each valve casing including a yielding resistance acting on the casing in opposition to the differential of fluid pressures thereon, the parts of each valve mechanism exposed to said differentials of fluid pressures being of substantially the same area, and said yielding resistances for said valve mechanisms having different tensions.

6. In a vacuum brake system for automotive vehicles including tractor and trailing vehicles, the combination with independently operable brake mechanisms for the trailer and tractor, a power actuator on each vehicle connected with brake mechanisms thereon, of a plurality of valve mechanisms on the tractor for independently controlling said actuators, each valve mechanism comprising a bodily movable valve casing provided with means for connecting it with sources of higher and lower fluid pressures, valve means movable with respect to the casing, said valve means and casing being provided with parts subjected to differentials of fluid pressures corresponding with those to which a movable part of the actuator controlled thereby is subjected, and tending to move said relative parts with respect to each other in a direction to prevent further increase in said differential of fluid pressures, an operator operated part on the tractor, connections therefrom to the valve means of each of said valve mechanisms, connections from each valve casing to a part connected with the tractor, said connections containing yielding resistance means, the parts of each valve mechanism exposed to said differentials of fluid pressures being of substantially the same area, the yielding resistance connected with the valve mechanism for controlling the trailer brake mechanism having greater tension than that connected with the valve mechanism controlling tractor brake mechanism.

7. In a vacuum brake system for automotive vehicles, the combination with independently operable brake mechanisms and a plurality of power actuators each of which is connected with certain of said brake mechanisms, of a plurality of valve mechanisms each controlling one of said actuators and each comprising a valve casing having opposite faces perpendicular to its axis, a main valve within the casing and substantially parallel to said faces, having marginal portions in sealing engagement with the casing and dividing it into separate compartments, said casing having a main valve seat in one of said compartments dividing it into separate chambers, and a disc valve in said compartment having a seat for engaging the main valve in a direction to disengage the main valve from its seat, and valve actuating means connected with said valves and movable with respect to the casing, means for connecting said chambers of each valve mechanism respectively with its actuator and with a source of suction, means for connecting said casing of each valve mechanism between the disc valve and the main valve thereof with a source of higher fluid pressure, a single operator operated part for said valve mechanisms, said valve mechanisms being bodily movable longitudinally of their axes and located in connections between said operator operated part and the part connected with the vehicle for effecting relative movement between the valve casing and valve actuating part of each valve mechanism, the corresponding faces of the parts of said respective valve mechanisms exposed to differentials of fluid pressures being of substantially equal area, and separate yielding resistance means connected with one of the relatively movable parts of each valve mechanism and acting in opposition to the resultant differential of fluid pressures thereon, said yielding resistance means exerting respectively different degrees of tension.

8. In a vacuum brake system for automotive vehicles, the combination with a plurality of independently operable brake mechanisms and a plurality of power actuators each of which is connected with certain of said brake mechanisms only, of a plurality of valve mechanisms, each controlling one of said actuators, and each provided with relatively movable parts subjected to differentials of fluid pressures corresponding to those to which a movable part of the actuator which it controls is exposed, and acting on the valve mechanism in a direction to prevent further increase in said differential of fluid pressures, means for connecting each of said valve mechanisms with a source of suction and with a source of higher fluid pressure, an operator operated part and separate yielding means acting upon each valve mechanism in opposition to the differential of fluid pressures thereon, and operatively connected with the operator operated part to increase the tension of each of said yielding means by a movement of the operator operated part to apply the brake mechanisms, the corresponding parts of said valve mechanisms effected by said differentials of fluid pressures being of substantially the same areas, and said yielding means for the respective valve mechanisms being constructed to apply different tensions thereto.

In testimony whereof we affix our signatures.

CALEB S. BRAGG.
VICTOR W. KLIESRATH.